Oct. 15, 1935.  O. W. HOVEY  2,017,832
FLOORING STRUCTURE
Filed Jan. 13, 1933  2 Sheets-Sheet 1

INVENTOR.
OTIS W. HOVEY
BY
John P. Tarbox
ATTORNEY.

Oct. 15, 1935.  O. W. HOVEY  2,017,832
FLOORING STRUCTURE
Filed Jan. 13, 1933  2 Sheets-Sheet 2

INVENTOR.
Otis W. Hovey
BY
John P. Tarbox
ATTORNEY.

Patented Oct. 15, 1935

2,017,832

UNITED STATES PATENT OFFICE 2,017,832

FLOORING STRUCTURE

Otis W. Hovey, Philadelphia, Pa., assignor to Edward G. Budd Manufacturing Company, Philadelphia, Pa., a corporation of Pennsylvania Application January 13, 1933, Serial No. 651,553

12 Claims. (Cl. 72—64)

The invention relates to a flooring or surfacing for roadways and the like adapted to support heavy loads concentrated on small areas of the flooring, and is particularly adapted for bridge flooring required in some instances to take a truck wheel load as high as 20,000 lbs. and with impacts loads of double that amount.

Such flooring has heretofore usually consisted of thick, heavy reinforced concrete slabs. The heavy slabs require that the supporting structure, including the longitudinal and cross girders directly supporting them, must be equally massive and strong and in long span bridges, as the George Washington bridge spanning the Hudson, where there may be many pounds of supporting structures for every pound of flooring, the weight of the flooring becomes a very important consideration.

It is an object of the invention to greatly lessen the weight of such structures, say in the neighborhood of ⅕ of the weight of concrete flooring, to provide a more durable structure, requiring less maintenance expense, one which is easy of fabrication, requiring no special moulds, flooring in which the surface is not so likely to crack or become uneven even under heavy use, in which better traction is had, and which is generally more efficient and durable than such structures as heretofore constructed.

These objects of the invention are attained by constructing the flooring proper of a steel grating preferably stainless steel of high tensile strength. The meshes of said grating are sufficiently close to insure a vehicle tire contacting over several of the meshes thereof and the top of the grating is adapted to form the wear surface of the roadway. The grating is preferably made of closely spaced relatively deep parallel bars or beams, the upper portions of which are connected by transversely extending vertical bars or webs forming therewith the grating proper. The parallel bars or beams are extended below the transverse webbing and form with the webbing, which is strongly joined thereto at closely spaced points as by spot welding, a very rigid truss structure. To increase the strength and give the structure a bottom for the filler as well as forming a means through which the flooring may be readily joined to the transversely running beams which support the flooring on the stringers running longitudinally of the roadway, the lower portions of the parallel bars are connected by laterally flanged hollow section members of light gauge themselves having a beam effect and when joined to the bars, as by spot welding, combining with those bars and the entire grating structure to greatly increase the load carrying capacity of the flooring and to distribute localized stresses over a large area in the manner of a reinforced concrete slab. Portions of these hollow section members are, in the preferred form, in the plane of the bottoms of the parallel grating bars and through them the reinforced grating structure forming the main strength-giving and load distributing portion of the flooring, are secured to the transverse beams forming with the flooring grating the portion of the bridge flooring structure usually supplied by the reinforced concrete slab.

Figure 1:
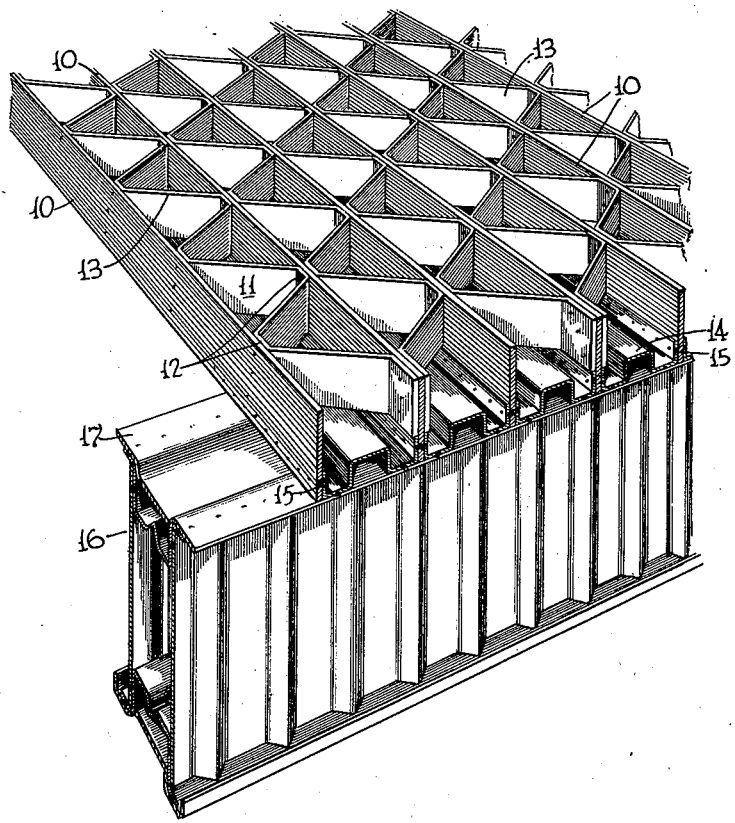
Fig. 1 shows in perspective the reinforced metal grating flooring of the invention and the manner of securing it to the transverse beams to form therewith the complete flooring to take the place of the usual reinforced concrete slab supported on the longitudinal bridge stringers.

The flooring proper consists of a grating consisting of a plurality of closely spaced parallel bars 10 having vertically extending webs. In the form of the invention shown in Figs. 1 to 3 these bars are plain strap bars. They are tied together to form a relatively fine mesh grating by transverse strap bars 11 which are bent to alternately engage through flattened portions 12 thereof, the adjacent parallel bars providing diagonal portions 13 extending between the bars. The flattened portions 12 of adjacent transverse webs overlap the opposite sides of the parallel bars in the same region, and to provide a smooth metal wear or tread surface for the flooring the tops of the parallel bars and the transverse connecting members are substantially flush. This arrangement of the bars and connecting members facilitates their assembly and joinder in the overlapping regions by spot welding to form an integral structure.

The parallel bars 10 extend below the transverse web members 11 a substantial distance and, in order to further stiffen and strengthen the structure and provide a closed bottom for the grating, the bars 10 are, in their lower portion connected by hollow sheet metal beams 14, which may be of lighter gauge than the main grating structure. These beams 14 have their flanged sides 15 overlap the lower portions of the bars in a manner to facilitate joinder of the parts by spot welding. When so joined to the bars 10 they constitute them in effect inverted T-beams, and add very materially to the strength of the structure.

Figure 2:
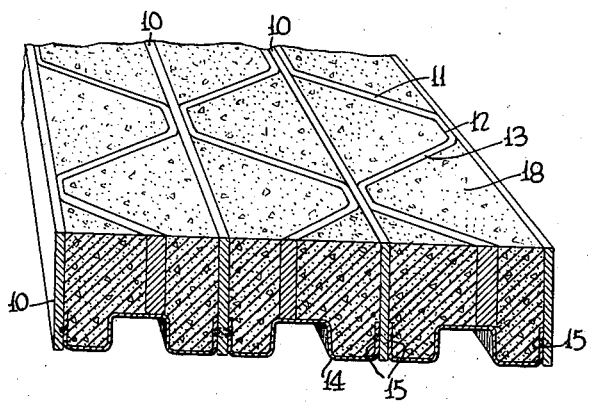
Fig. 2 shows in perspective a fragmentary view of the flooring provided with a filler.

In the form of the invention shown in Figs. 1 and 2 the hollow beam 14 comprises lateral upwardly facing channels and a central downwardly facing channel. The bottoms of the lateral upwardly facing channels are flush with the bottoms of the bars 10 and rest with said bars on the transverse beams 16 arranged at suitably spaced intervals to support the flooring proper from the longitudinal stringers (not shown). The beams 16 are also preferably light gauge hollow section beams of high tensile stainless steel strips spot welded together to form a box section structure provided at the top with laterally extending flanges 17 upon which the flooring proper rests and to which it may readily be secured by spot welding the bottoms of the channels of hollow beams 14 to the flanges 17.

The parts so joined form a very strong flooring structure because of the integral joinder and shape of the parts and their construction out of relatively light gauge high tensile stainless steel. The structure is a very durable one and lends itself readily to repair, and requires no painting to protect the parts against corrosion. The parallel bars are preferably spaced apart a distance substantially less than the width of the tire of heavy vehicles so that the entire load of a wheel is taken by more than one bar. By reason of the construction the wheel load stresses concentrated at one point are distributed over a relatively large area.

The integral metallic structure described constitutes the main strength-giving structure of the flooring but to provide a smooth roadway and to contribute somewhat to the strength, a filler 18 of concrete, asphalt or the like is poured while fluid into the interstices formed by the metal structure, which, when it hardens, particularly if concrete having a high compression strength is used, adds quite materially to the strength of the structure. The filler flows under the transverse members 11 of the grating and thus provides an interlock therewith, holding it in place without additional means.

The metallic structure may be additionally stiffened and strengthened by welding the bottoms of the central channels of the beams 14 to the bottoms of the diagonal portions of the transverse bars 11.

Figure 3:
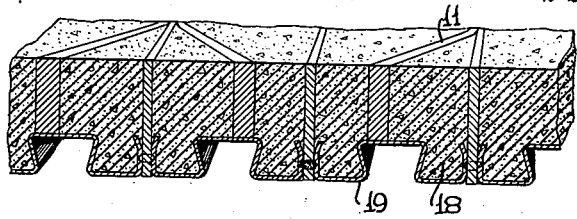
Figs. 3, 4, 5, 6 and 7 show views similar to Fig. 2 of further modifications.

In the modification shown in Fig. 3 the hollow beams 19 are formed with inclined sides, whereby they form a dovetail interlock with the filler material 18. Otherwise, the structure is identical with that shown in Figs. 1 and 2.

Figure 4:
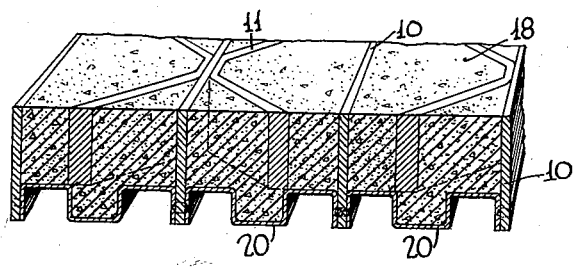

In the modification shown in Fig. 4, the hollow beams 20 are constructed the reverse of that shown in Figs. 1 and 2, having two downwardly facing channels at the sides and a central upwardly facing channel. This construction permits the use of shorter welding tongs for joining the beam members 20 to the parallel bars 10, but necessitates the turning of the work to gain access for welding. The structure of Figs. 1 and 2 permits all the welding on the floor structure proper to be done from the one side of the work.

Figure 5:
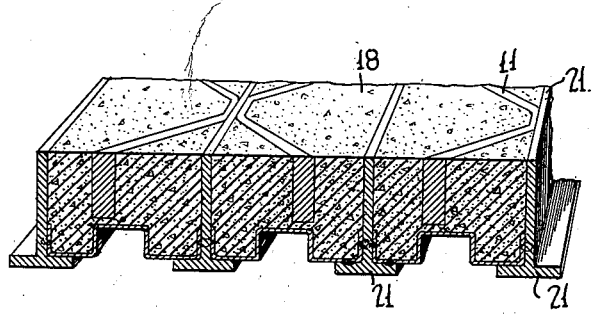

In the modification of Fig. 5, inverted T-bars 21 are used instead of the plane bars 10, and the transverse portions 13 of bars 11 are shown, spaced throughout, from the bottom closing and reinforcing hollow beam 14, thereby permitting a stronger interlock between the filler material and the bars 11. This spacing may also be employed in any of the other forms of the invention, if desired.

Figure 6:
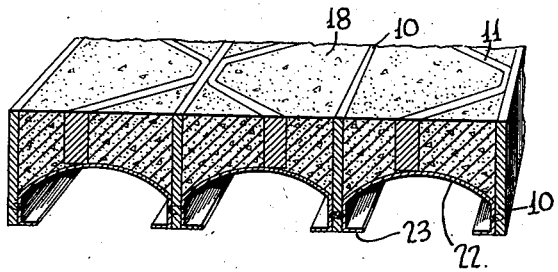

In the modification shown in Fig. 6, hollow beams 22 of generally downwardly presenting channel section are used in place of the beams 14 shown in Figs. 1 and 2, the side walls of these channels fitting against and being welded to the bars 10 and their bottom walls being arched upwardly. To secure the grating structure of the flooring to the transverse beams and to stiffen and strengthen the entire structure, the side walls of the channels are flanged inwardly in the plane of the bottom of the bars 10 as indicated at 23.

Figure 7:
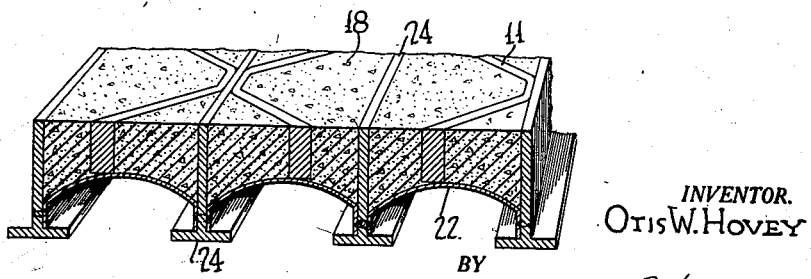

In the modification of Fig. 7, the construction is similar to that in Fig. 6 except that inverted T-bars 24 are substituted for the bars 10 and the inward flanges on the arched channel members become unnecessary, and are omitted, since the floor grating can be secured to the transverse beams 16 through the flanges provided by the T-beams.

While a specific structure has herein been described and several alternative modifications of said structure, it will be understood that it is not desired to limit the invention to the specific forms shown, but to cover in the appended claims other forms and modifications such as would readily occur to one skilled in this art.

What I claim is:

1. A flooring structure comprising a grating of steel bars consisting of spaced vertical members and transversely extending web members connecting the vertical members, the vertical members extending a substantial distance below said transversely extending web members and transversely extending hollow section strips bridging the space between said downwardly extended portions of the vertical members and having edge portions fitted against and reinforcing the vertical members, all said members being spot welded together to form a truss structure.

2. A flooring structure comprising spaced vertical beams interconnected adjacent the top thereof by webbing and metal strips of hollow section extending between the beams below said webbing and having marginal portions overlapping and secured to said beams to reinforce the same and to form a continuous bottom for a filler, and a filler filling the spaces between said beams and webbing above said bottom.

3. A flooring structure comprising spaced vertical beams, interconnected adjacent the top by webbing, and separate strips having marginal flanges bridging the space between adjacent beams and integrally secured thereto through said flanges to increase the strength of the beams against bending, said strips forming a continuous bottom between the beams, and a filler fitting the space between said webs and beams above said bottom.

4. A flooring structure comprising a grating including parallel bars and transverse bars connecting said parallel bars and having their top edges substantially in the plane of the tops of the parallel bars, the parallel bars extending a substantial distance below said transverse bars and hollow beam strips bridging the space between said lower portions of the parallel bars flanged in their edges and integrally secured through said flanges to the parallel bars to form therewith a reinforced structure.

5. A flooring structure comprising a grating including interconnected parallel bars and transverse bars, the parallel bars having portions extending a substantial distance below the transverse bars, and hollow section beams bridging the space between and interconnecting and reinforcing said extended portions of the parallel bars, said hollow section beams having edge flanges through which they are secured to said extended portions of the parallel bars.

6. A flooring structure comprising a grating including interconnected parallel bars and transverse bars having their upper faces flush, the parallel bars extending a substantial distance below the transverse bars, and hollow section beams of relatively light gauge having marginal portions overlapping and rigidly secured to reinforce and transversely interconnect said extended portions of the parallel bars, and having portions thereof flush with the bottoms of the parallel bars.

7. A floor structure including vertical metal bars, a sheet-metal bottom member therebetween having marginal flanges overlapping and rigidly secured to said bars and having top and bottom opening channels of substantial depth, the top edges of said bars extending above said bottom member, and a trussing bar secured between said first bars above said bottom member.

8. A floor structure including vertical bars, a group of sheet-metal bottom members disposed one between the bars of each pair thereof side welded thereto and each having top opening side channels and a bottom-opening mid-channel, the top edges of said bars extending above said bottom members, and substantially sinusoidal bars having flat crest and trough portions side welded to said first bars above said bottom members.

9. A floor structure including vertical metal bars, a group of sheet metal bottom members disposed one between the bars of each pair thereof side welded thereto and each embodying top opening side channels having inturned outer side walls and a bottom opening mid channel, the top edges of said bars extending above said bottom members, and trussing bars welded to said first bars above said bottom members.

10. In combination, a floor layer comprising a sheet metal reticular tread structure having parallel downwardly extended beams and a sheet metal hollow section bottom member having flanged margins rigidly secured to the downward extensions of said beams, and a hollow sheet metal base beam thereunder to which said member is welded.

11. In combination, a beam having a transversely-extended, thin-gauge, sheet metal, top ledge, and a floor layer comprising a thin-gauge, corrugated, bottom, sheet-metal member overlapping and welded to the ledge, heavy-gauge, sheet-metal, tread members resting directly on the beam and heavy-gauge, sheet metal, tread members trussing said first-named tread members against lateral stresses, and arranged above the bottom corrugated member and rigidly secured to said first tread members.

12. A floor structure including vertical metal bars, a sheet metal bottom member bridging the space between said bars and secured thereto through marginal flanges overlapping said bars, the top edges of said bars extending a substantial distance above said bottom member, and a transverse trussing bar extending between the upper portions of said first bars.

OTIS W. HOVEY.